United States Patent [19]

Seim

[11] Patent Number: 4,785,353

[45] Date of Patent: Nov. 15, 1988

[54] BLOCK READABLE VIDEO IMAGER HAVING NOISE COMPENSATION

[75] Inventor: Roy H. Seim, San Diego, Calif.

[73] Assignee: Eastman Kodak Company, Rochester, N.Y.

[21] Appl. No.: 25,449

[22] Filed: Mar. 13, 1987

[51] Int. Cl.⁴ .............................................. H04N 3/14
[52] U.S. Cl. ........................... 358/213.26; 358/213.15
[58] Field of Search ...................... 358/213.26, 213.27, 358/213.11, 213.15, 213.17, 213.18

[56] References Cited

U.S. PATENT DOCUMENTS

| | | | |
|---|---|---|---|
| 4,322,752 | 3/1982 | Bixby | 358/213.27 |
| 4,330,796 | 5/1982 | Anagnostopoulos et al. | 358/213.26 |
| 4,400,734 | 8/1983 | Davy | 358/213.17 |
| 4,589,028 | 5/1986 | Ochi | 358/213.18 |
| 4,679,090 | 7/1987 | Erhardt | 358/213.18 |

Primary Examiner—Jin F. Ng
Assistant Examiner—Stephen Brinich
Attorney, Agent, or Firm—William F. Noval

[57] ABSTRACT

A video imager which is read out in block format is compensated for fixed pattern noise and shading in a single, economical and efficient manner. In block readout, a plurality of rows of photosites are read out of the sensor simultaneously. According to the invention, a single noise compensation data is stored for each column of photosites in a block, thus reducing the number of compensation data which must be stored and consequently, the size of the memory needed. Additionally, a single set of compensation data for a block may be used for multiple frame rates or for several blocks in a frame, thereby further reducing the memory capacity for storing noise compensation data. The invention is useful in fast frame recorders operable at multiple frame rates.

4 Claims, 6 Drawing Sheets

BLOCK READABLE VIDEO IMAGER HAVING NOISE COMPENSATION

BACKGROUND OF THE INVENTION

In general, this invention relates to video imaging apparatus which is read out in block format. More particularly, this invention relates to video imaging apparatus in which video signals read out from an imager in block format are compensated for fixed pattern noise, dark current noise and shading noise. The technique of the invention is particularly useful in motion analyzers which record at multiple frame rates.

Video imaging apparatus such as electron beam tube imagers and CCD or MOS solid state imagers tend to produce signals even when the imager is completely shielded from light. Shading, dark current and fixed pattern noise are undesirable since such noise distorts the video signal produced when the imager is exposed to an optical image. In solid state imagers, it has been found that the dark level varies over the width of the imager, the darkness being greater toward the imager edges due to geometrical effects. There is also fixed pattern noise caused by the clocking of the sensor. Such noise is spatially non-uniform thereby introducing a noise in the output video signal. This noise causes image degradation.

In electron beam tube imagers, it is possible to adjust the target voltage of the tube for a specified dark current which is an average of the raster scan of the tube during the placement of a lens cap over the camera lens (See, e.g., page 51, of the textbook "Basic Television and Video Systems" by Bernard Grob, McGraw-Hill Book Company, New York 1984). Although this technique may be suitable for conventional television applications where details in the received image ordinarily are not critical to a viewer's understanding of the program content, such a technique would be undesirable in a motion analysis system where image degradation or loss of sensor sensitivity may cause failure of an expensive and time consuming motion analysis experiment.

Another technique for dark current compensation which has been proposed for use in solid state charge transfer devices (see, e.g., page 172 of the textbook entitled "Charge Transfer Devices" by Sequin and Tompsett, Academic Press, Inc., New York, 1975) involves the subtraction of fixed pattern noise produced by a spatially, non-uniform dark current during alternate video fields. In this technique, an optical shutter in front of an area image sensor is the device to integrate the dark current pattern. During the following field, this dark current signal is inverted and recirculated back into the same positions of the photosites while the optical signal plus the dark current signal are integrated. When the video signal is read out of the charge transfer device, the two signals are combined and the dark current signal is cancelled. This technique reduces the frame rate of the video imaging device and would be disadvantageous at fast frame rates in motion analysis systems where each frame is critical in analyzing a failure in a machine under inspection.

It has also been proposed in single frame rate video cameras to store dark current, fixed pattern and shading correction signals for each pixel in the raster array of a solid state imager. The compensation signal is then applied pixel by pixel as a video signal is read out of the imager. This technique, however, would require a large memory in a multiple frame rate motion analysis system thus increasing the cost and complexity of such a system.

SUMMARY OF THE INVENTION

According to the present invention, there is provided a noise compensation system which is particularly effective in block readable area image sensor systems which are operated at several frame rates, which obviates the disadvantages of the aforementioned dark current compensation techniques. It has been discovered that it is not necessary to store separate noise compensation signals for every pixel in am image sensor, rather a single compensation signal may be used to compensate each pixel in a column of pixels in a block. Thus, it is feature of the present invention to provide a set of noise compensation signals such that the same compensation signal is applied to each pixel video signal in a column in a block readable image sensor. It has also been discovered that the same correction values may be used for several frame rates in an imaging system in which an imaging sensor is read out at multiple frame rates. It is thus another feature of the present invention to provide at least one set of compensation signals for one or more frame rates of an imaging system and a second set of compensation signals for one or more different frame rates of the system. It has also been discovered that for an image sensor which includes a plurality of blocks of photosites, noise compensation signals derived from only some of the blocks need be stored. These compensation signals are then used to compensate for all of the blocks of the area image sensor. Thus, according to another feature of the present invention, a block readable image sensor utilizes a single set of noise compensation signals derived from one block of the sensor to compensate at least one other block of the sensor.

DESCRIPTION OF THE DRAWINGS

In a detailed description of a preferred embodiment of the invention presented below, reference is made to the accompanying drawings in which like numerals refer to like elements.

DESCRIPTION OF THE PREFERRED EMBODIMENTS

In the following description of the preferred embodiments of the noise compensation techniques of the present invention, it will be described as included in a motion analyzer in which video information is recorded on magnetic tape. It will be understood however that the present invention may be applied to other applications where a video imager readout in block format is used either in single or multiple frame rate video systems.

The application in which the embodiment of the present invention will be described relates to a motion analyzer which records scene information at a high frame rate and plays back such information at a slower frame rate, thereby allowing slow motion analysis of a moving object. The imager frame rate used for recording in the example given below is variable between 30 and 1,000 frames per second. At the highest frame rate, the exposure time for each frame is 1/1000 sec. which is short enough to provide high resolution and prevent image smear of rapidly moving objects.

Figure 1:
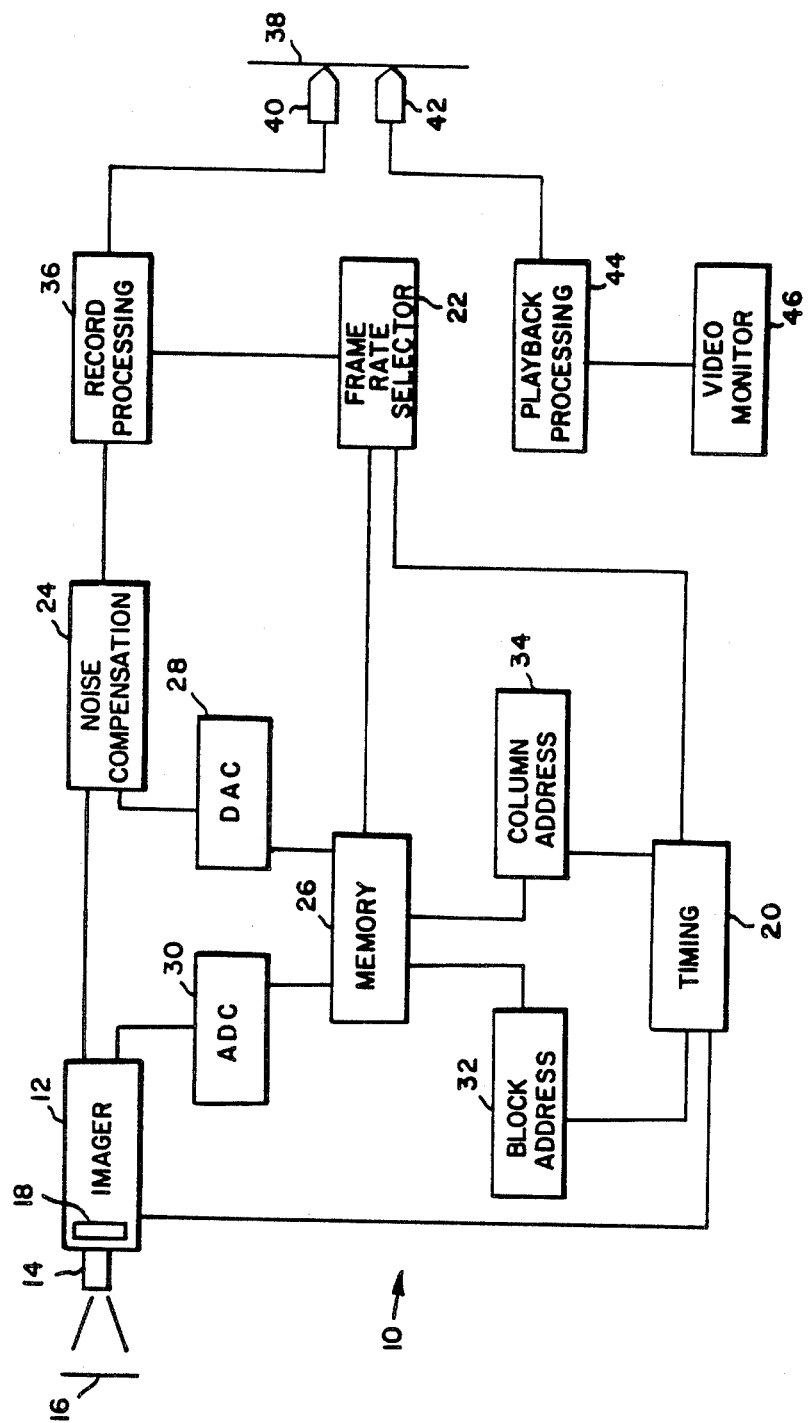
FIG. 1 is a functional block schematic diagram of a motion analyzer including an embodiment of the present invention.

Referring to FIG. 1, there is shown a functional block schematic diagram showing a motion analyzer which includes an embodiment of the present invention. The motion analyzer 10 includes an imager 12 having a lens 14 which images a scene 16 on an area image sensor 18. Imager 12 is controlled by clock circuit 20 which supplies suitable timing signals to imager 12 as a function of the operator selectable frame rate entered into frame rate selector 22.

Sensor 18 is a block readable area image sensor. The basic concept of a block readout of a solid state area image sensor is disclosed in U.S. Pat. No. 4,322,752 in the name of James A. Bixby, which incorporated herein by reference. (see also commonly-assigned U.S. Pat. Nos. 4,330,796 and 4,322,638).

According to the present invention, the video received from imager 12 in block format (i.e., a plurality of channels of simultaneous video information) is corrected for dark current and other noise by noise compensation circuit 24. Circuit 24 receives compensation signals from memory 26 by way of digital to analog converter (DAC) 28. Memory 26 has stored in it digital representations of noise compensation signals which are applicable to columns of signals in a block of video signals read out from imager 12. These noise compensation signals may be derived from imager 12 through analog to digital converter (ADC) 30. The specific location in memory 26 of a noise compensation signal is addressed as a function of block address circuit 32, column address circuit 34, and the frame rate from selector 22.

The noise compensated video signals are suitably processed by record processing circuit 36 for recording in parallel tracks on magnetic tape 38 by means of record head assembly 40. A reproduce head assembly 42 reproduces the parallel video signals from tape 38 which are processed by playback processing circuit 44 for display of an image on video monitor 46. (Exemplary record and playback processing circuits for block format video applications are described in commonly assigned, U.S. Pat. No. 4,496,995).

Figure 2:
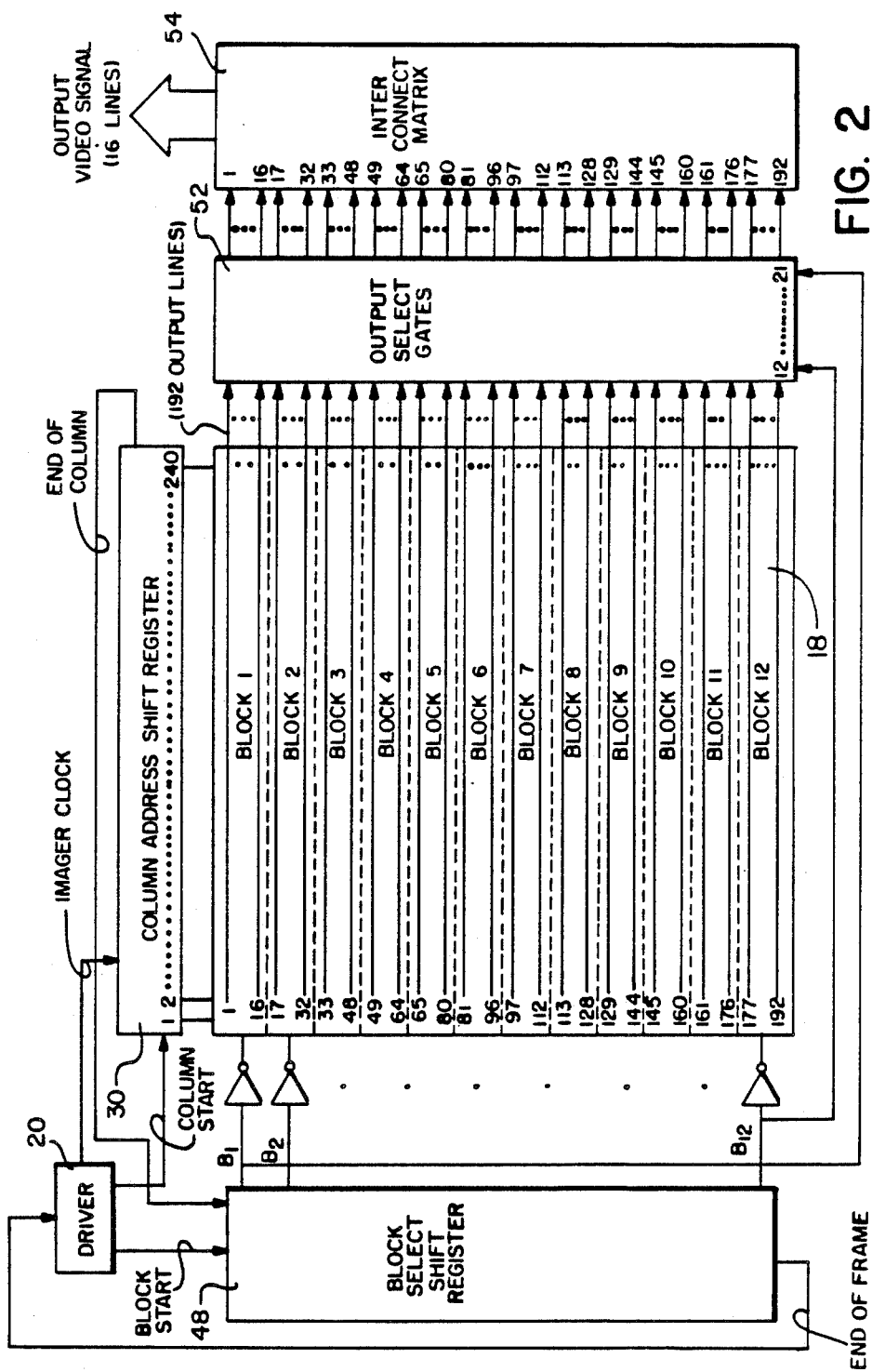
FIG. 2 is a functional block schematic diagram of a block readable area image sensor.

Since the noise compensation technique of the present invention relates to compensation of blocks of video signal, the basic concept of block readout will be explained with reference to FIGS. 2, 3, and 4. FIG. 2 shows a block readable area image sensor 18 that includes an array of photosensitive sites arranged in 192 rows and 240 columns. For purposes of readout, sensor 18 is formatted into 12 blocks of 16 photosite rows each (as indicated by dashed line). Each photosite is readable upon the application thereof of an enablement signal and an address signal. To begin readout, timing circuit 20 produces a BLOCK START signal that causes a block select shift register 48 to produce an enablement signal that enables (via block enable line $B_1$) all photosite rows within block 1) (i.e. rows 1–16). In response to a COLUMN START signal from timing circuit 20, column address electronics in the form of a column address shift register 50 sequentially addresses the 240 photosite columns of the entire area image sensor 18. Because the photosite rows within blocks 2–6 (rows 17–192) are not enabled, only photosite rows 1–16 (block 1) are read out at this time. The remaining photosites in the non-enabled blocks continue to integrate charge in response to incident radiation from scene 16. After all columns have been addressed and END OF COLUMN signal sequences the block select shift register 48 to enable via block enable line $B_2$, the block 2 photosite rows (i.e. rows 17–32). Column wise readout then proceeds as described above for the block 2 photosite rows. This process is repeated until all 12 blocks of photosite rows are read out, at which time END OF FRAME signal from register 48 resets timing circuit 20 for readout of the next frame of imager 18.

Output select gates 52 and interconnect matrix 54 of conductive bus lines perform the function of a block multiplexer that causes only signals from the 16 photosite rows within the block that is being read out to appear as an output signal. Reference is made to U.S. Pat. No. 4,322,752, referenced above for a more detailed discussion of the construction of an exemplary output select gate 52 and matrix 54.

As a result of such readout, a series of blocks of video information constituting a frame is produced with each block of video information containing 16 lines of video signals arranged in parallel. A result of such a readout technique is a reduction of the time required for area image sensor readout by a factor of 16 (i.e. the number of rows in a block).

Figure 3:
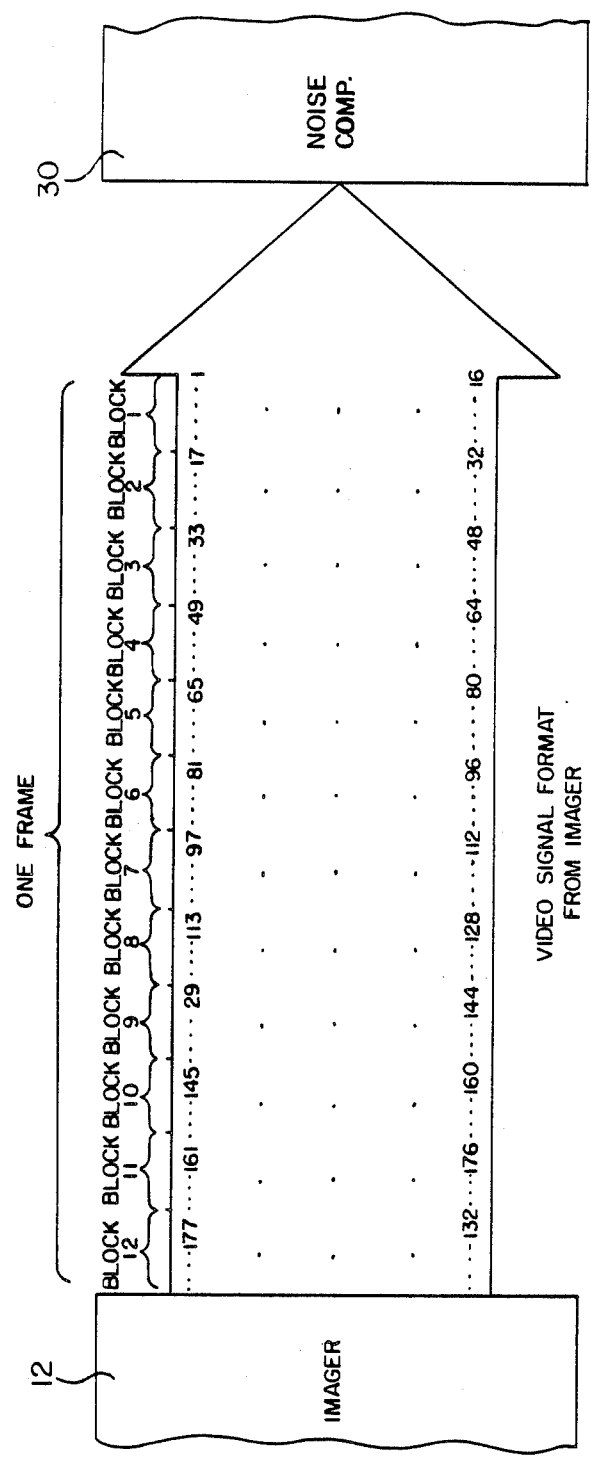
FIG. 3 depicts the format of a video signal block readout of an area image sensor.
Figure 4:
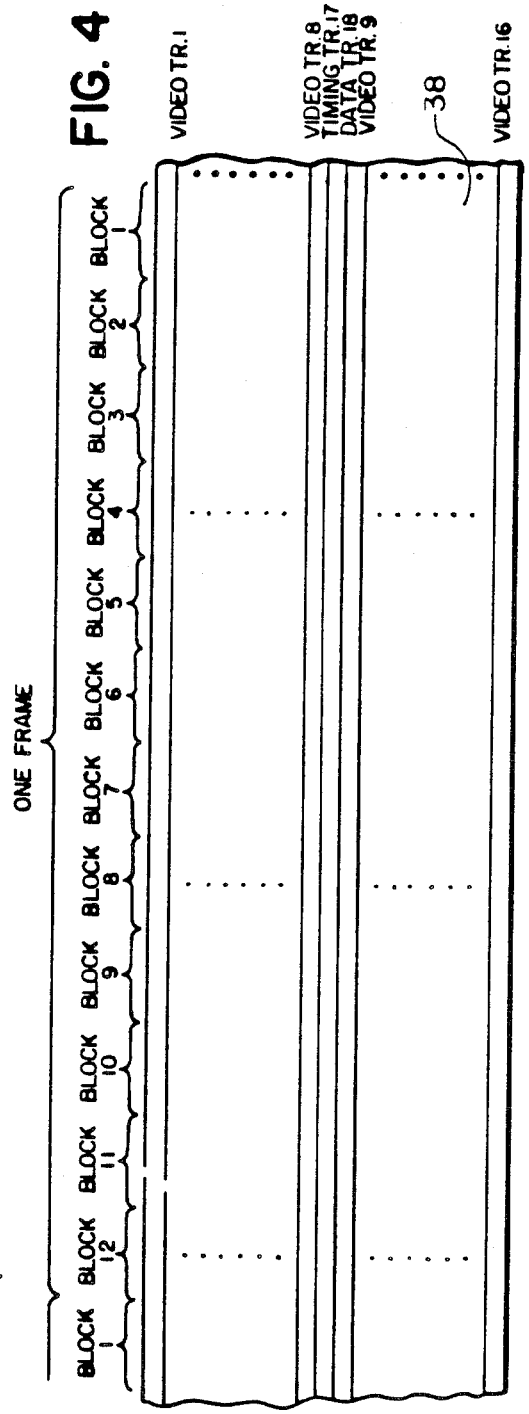
FIG. 4 shows the multitrack format of video information and digital data recorded longitudinally on magnetic tape.
Figure 6:
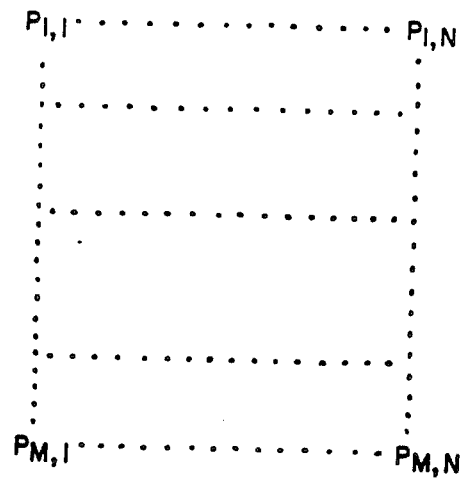
FIGS. 6-8 are diagrammatic showings useful in describing the operation of the embodiments of the present invention.

As shown in FIG. 3, the video signal resulting from block readout of a single frame from area image sensor 18 is comprised of a serial train of blocks of video information wherein each block is comprised of 16 lines of video information that correspond to the 16 rows of photosites within each block of sensor 18. Each individual line of video information is an analog signal varying in level proportionate to the level of scene illuminance, and each line contains, for example, 240 picture elements (pixels) that correspond respectively to the 240 photosites in each row of photosites. An individual pixel may be represented generally as being located in one of m rows and in one of n columns. Thus, the location of a pixel P in row 2, column 4 may be represented by the nomenclature $P_{2,4}$. As shown in FIG. 6, the matrix of pixels for the area image sensor 18 is shown as including pixels $P_{1,1}$–$P_{l,n}$ to $P_{m,1}$ –$P_{m,n}$. In the example given, m=192, the number of rows of photosites of sensor 18 and n=240, the number of columns of photosites of sensor 18.

As shown in FIG. 3, each channel of information includes the video information of every 16th line of image sensor 18. Thus, the first video information channel includes lines 1, 17, 33, 49, 65, 81, 97, 113, 129, 145, 161, and 177, and the last video information channel includes lines 16, 32, 48, 64, 80, 96, 112, 128, 144, 160, 176, and 192.

According to the present invention, a block of video signals comprising a plurality of lines of video information are compensated for fixed pattern noise, dark current noise, shading noise, and other noise which tend to distort and degrade a reproduced video image. In applications involving motion analysis of a defective piece of machinery, for example, a great deal of time and expense may be expended to set up the motion analysis experiment. A single area of a single frame of video may hold the key to the failure of the equipment under test. Thus, any noise (such as above) which degrades or distorts the captured and recorded image is undesirable.

Figure 5:
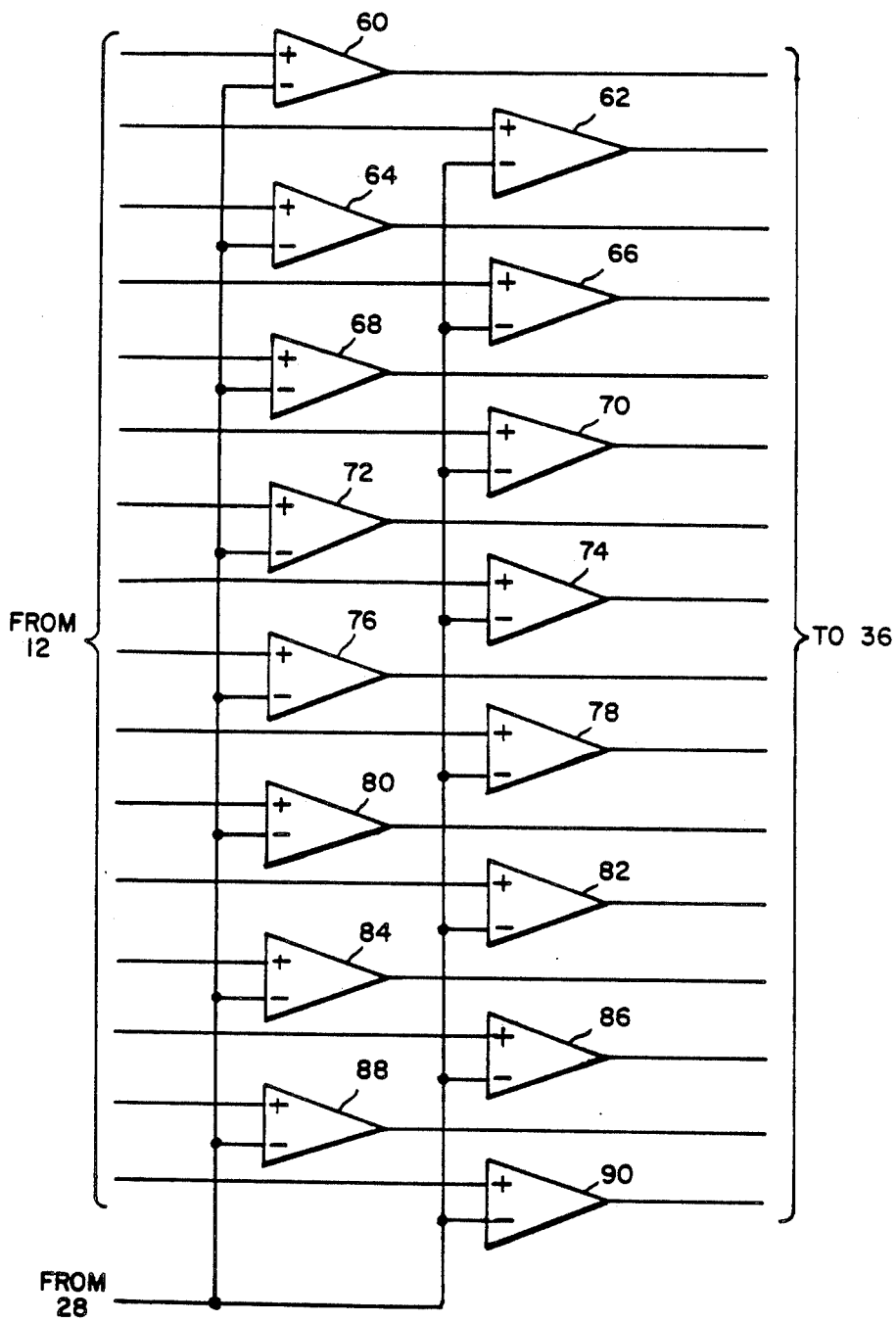
FIG. 5 is a schematic diagram of the noise compensation circuit of FIG. 1.

According to the present invention, a single noise compensation signal is applied to each video signal included in a column of video signals in a block. An exemplary circuit for effecting noise compensation according to the present invention is shown in FIG. 5. The sixteen channels (Ch. 1–Ch. 16) of video information from imager 12 are respectively applied to the noninverting inputs (+) of sixteen operational amplifiers. 60, 62, 64, 66, 68, 70, 72, 74, 76, 78, 80, 82, 84, 86, 88, and 90. For each column of pixels of video information applied to amplifiers 60–90, the same noise compensation data signal read out of memory 26 is applied to the inverting inputs (−) of amplifiers 60–90, which produce sixteen channels of noise compensated video which are applied to processing circuit 36.

In the example given above, the same compensation signal is applied to each of the 16 video signals forming a column of signals in a block. For a block of 16 lines of video information with 240 pixels for each line, a set of 240 noise compensation signals are needed for each block. Thus, there is a substantial reduction in the size, cost, and complexity of memory and associated control circuitry for storing the compensation signals. For example, if a different compensation signal were stored for every pixel in a block of video signals, a memory 16 times as large as the memory according to the present invention would be needed. Thus, assuming a frame includes 192 rows of pixels having 240 pixels per row, and assuming that the digital memory stores a byte of memory for each compensation signal, 46K bytes of memory would need to be provided for each frame at which the analyzer operated. For a motion analyzer operating at six different frame rates, 276K bytes of memory are required. However, according to the present invention, since only one set of compensation signals are provided for each block of video information, the storage capacity of memory 26 is greatly reduced. In the example given, a little under 3 kilobytes of memory would be needed for each frame rate or a little over 17 kilobytes for a motion analyzer operable at six different frame rates.

The reduction in memory will vary, of course, with the size of the pixel matrix of the image and with the format of block readout (i.e., number of rows per block).

Figure 7:
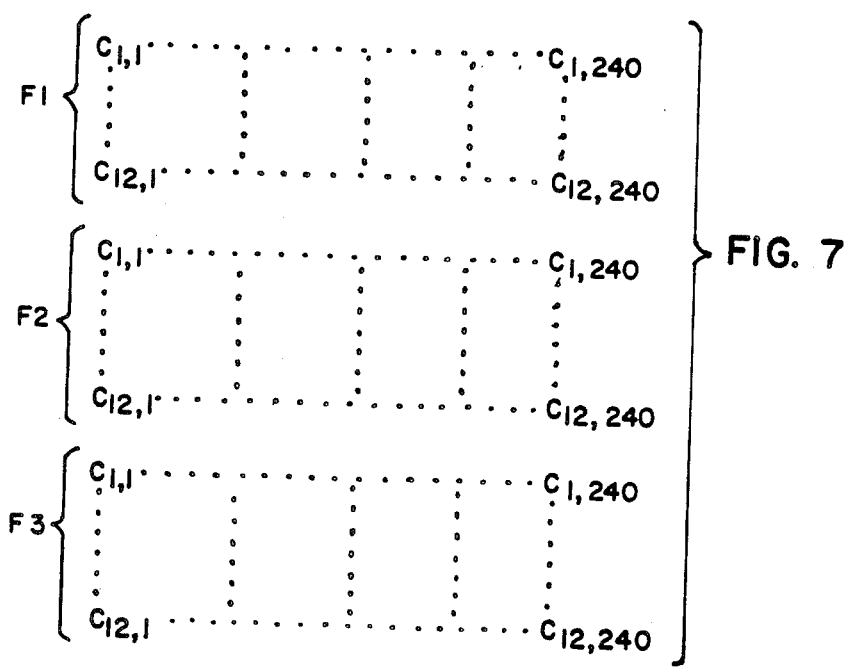

FIG. 7 illustrates implementation of the invention described above. The imager 12 is operated at 3 frame rates F1, F2, and F3 and a set of noise compensation data are provided for reach block for each frame rate. Thus, for each frame rate there are 12 sets of compensation data which are represented by $C_{1,1}$–$C_{1,240}$ to $C_{12,1}$, to $C_{12,240}$. Each frame rate F2 and F3 has different sets of compensation data for each of the blocks.

Figure 8:
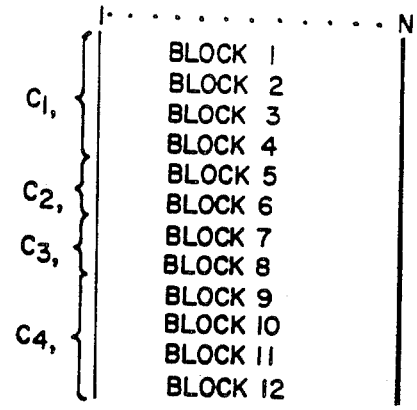

According to another embodiment of the compensation technique of the present invention, it has been discovered that a single set of noise compensation data may be used for several different frame rates. Thus, in the example of FIG. 7, the compensation values for frame rate F1 is also applied for frame rate F2 whereas a different set of compensation data are provided for frame rate F3. It has been further discovered that a single set of compensation data may be used for several blocks within a frame. For example, as illustrated in FIG. 8, the set of compensation values labeled "$C_1$" is used for blocks 1, 2, 3, and 4. The set of values labeled "$C_2$" is used to compensate blocks 5 and 6. The set of values labeled "$C_3$" is used for blocks 7 and 8, and the set of values labeled "$C_4$" is used for blocks 9, 10, 11, and 12. Moreover, the multiblock compensation data may be used for several framerates to further decrease the amount of memory needed for storing compensation data in a multiple frame rate motion analysis system. As an example, it has been found that four sets of compensation data may be used for compensating an image sensor read out in 12 blocks of video information at frame rates of 30, 60, 125, 250, and 500 frames per second and four different sets of compensation data may be used for compensating the 12 blocks of video information read out from the image sensor at 1,000 frames per second.

Although the embodiments of the present invention have been described above with respect to a solid state area image sensor, it will be understood that the invention is also applicable to any application involving block readout of any image sensor (such as an electron beam tube image sensor), which is also susceptible to noise such as dark current, fixed pattern noise. As mentioned above, the present invention is applicable to both single frame rate and multiframe rate block readable imager apparatus. Moreover, although the examples given show an analog noise compensation circuit, it will be understood that digital techniques may also be used for compensating the video information signals.

Although the invention has been described in detail with particular reference to preferred embodiments thereof, it will be understood that variations and modifications can be effected within the spirit and scope of the invention as described hereinabove and as defined in the appended claims.

What is claimed is:

1. In video imaging apparatus including a sensor having a plurality of photosites arranged in an array of rows and columns, the invention comprising:
    sensor readout means for reading out said sensor in sequential blocks of parallel rows of photosites, such that the photosites included in a column are read out simultaneously, to produce an output signal including sequential blocks of video information, wherein each block of video information includes parallel lines of video signals arranged in columns of pixel video signals corresponding to the columns of photosites within a block;
    memory means for storing a set of noise compensation signals for at least one block of rows of photosites of said sensor, wherein each noise compensation signal of said set is applicable to all of the photosites in a column of photosites; and
    circuit means for reading out said set of compensation signals from said memory means and for compensating said one block of said output signal by applying to each pixel signal in a column of pixel signals the noise compensation signal corresponding to said column.

2. The invention of claim 1 wherein said sensor readout means reads out said sensor at two different frame rates; wherein said memory means stores a different set of noise compensation signals for said one block for each of said frame rates; and wherein said circuit means reads out from said memory means and applies to said block of said output signal the set of compensation signals which correspond to the frame rate at which said sensor is read out.

3. The invention of claim 1 wherein said sensor readout means reads out said sensor in at least three sequential blocks of video information; wherein said memory means stores one set of noise compensation signals for one of said three blocks of video information and another set of noise compensation signals for the other two blocks of said video information; and wherein said circuit means reads out from said memory, and applies to said three blocks of said output signal, the set of compensation signals appropriate to each said block.

4. In video imaging apparatus including a sensor having a plurality of photosites arranged in an array of rows and columns, the invention comprising:

sensor readout means for reading out said sensor at several different frame rates, in sequential blocks of parallel rows of photosites, such that the photosites included in a column are read out simultaneously, to produce an output signal including sequential blocks of video information, wherein each block of video information includes parallel lines of video signals arranged in columns of pixel video signals corresponding to the columns of photosites within a block of photosites;

memory means for storing different sets of noise compensation signals for each of said frame rates, wherein a set of compensation signals is provided for at least a selected block of rows of photosites of said sensor and each noise compensation signal of said set is applicable to all of the photosites in a column of photosites; and circuit means connected to said readout means and said memory means for modifying the output signal from said readout means by applying a set of compensation signals from said memory means to the selected block of video information of said output signal by applying to each pixel signal in a column of pixel signals, the noise compensation signal corresponding to said column.

* * * * *